(12) United States Patent
Elwell et al.

(10) Patent No.: US 8,687,054 B1
(45) Date of Patent: Apr. 1, 2014

(54) METHOD AND SYSTEM FOR INDIVIDUALIZED VIDEO PROGRAM CONTENT

(75) Inventors: Joseph Elwell, San Diego, CA (US); Alan Buhler, San Diego, CA (US); Marianne Y. Lu, Encinitas, CA (US)

(73) Assignee: Intuit Inc., Mountain View, CA (US)

( * ) Notice: Subject to any disclaimer, the term of this patent is extended or adjusted under 35 U.S.C. 154(b) by 372 days.

(21) Appl. No.: 13/089,587

(22) Filed: Apr. 19, 2011

(51) Int. Cl.
*H04J 14/08* (2006.01)
(52) U.S. Cl.
USPC .................. 348/55; 348/42; 348/43; 348/51; 348/54
(58) Field of Classification Search
USPC ...................................................... 348/42–60
See application file for complete search history.

(56) References Cited

U.S. PATENT DOCUMENTS

| | | | |
|---|---|---|---|
| 2009/0167845 A1* | 7/2009 | Khan | 348/51 |
| 2010/0079585 A1* | 4/2010 | Nemeth et al. | 348/54 |
| 2010/0177172 A1* | 7/2010 | Ko et al. | 348/53 |
| 2010/0182407 A1* | 7/2010 | Ko et al. | 348/49 |
| 2011/0122238 A1* | 5/2011 | Hulvey et al. | 348/56 |

* cited by examiner

*Primary Examiner* — Andy Rao
*Assistant Examiner* — Tyler Edwards
(74) *Attorney, Agent, or Firm* — Hawley Troxell Ennis & Hawley LLP; Philip McKay (57) ABSTRACT

A method and system for providing individualized video program content whereby currently available synchronized active shutter technology, such as is implemented in currently available 3-D televisions, and multiple channel audio technology, such as stereo, or 5:1 surround sound technology, is modified to provide two or more interlaced versions of at least a portion of a video program such that two or more "classes", or types of viewers, can virtually simultaneously view separate versions of the portion of a video program in a single run of the video program, i.e., in the same viewing of the program by both types of viewers.

6 Claims, 4 Drawing Sheets

METHOD AND SYSTEM FOR INDIVIDUALIZED VIDEO PROGRAM CONTENT

BACKGROUND

Currently, numerous forms of video programs are available to individuals and households, such as, but not limited to, DVD media, Blu-ray media, on-demand television, on-demand movies, and digital video programs and downloads. In addition, with the advent of numerous portable video capable devices, more opportunities to obtain, and/or own, and or view, various forms of video programs are available than ever before.

In addition, more recently, three-dimensional video program viewing devices, such as three dimensional televisions (3-D TVs) have become more and more common; thereby providing individuals and households even more incentive to view and enjoy video programs in their own home.

However, as video programs have become easier to obtain, own, and/or view, the issue of content control, i.e., ensuring that the content of video programs is appropriate for all members of the household, including children and adults, has become a significant factor. Currently, the presence of inappropriate video and/or audio segments associated with a video program results in the inability of the entire family to enjoy the video program together, as a family unit. As a result, either the adult family members must forgo viewing video programs with inappropriate content, or the family separates into different rooms to view their respectively appropriate video programs.

The issue of content control is particularly complicated when a given video program is largely appropriate for viewing by all family members but contains certain portions that are not appropriate for children. In these situations, and entire family can be prevented from watching an otherwise desirable video program for the sake of a few scenes which are inappropriate for one or more family members.

To address this problem, historically, some video programs have been created in multiple versions, including distinct "child friendly" versions. However, currently, very few video programs are actually created with child friendly versions. Consequently, it is relatively rare that a desired video program is available in a child friendly version. In addition, currently, even when child friendly versions of the video program are available, the adults in the family are denied the ability to view the video program in its original version unless they are willing to pay for two versions of the video program. However, even if they do pay for two versions of the video program, once again, the family views the video program separately, and an opportunity to provide an activity for the entire family is lost.

What is needed is a method and system that provides two viewers, or two classes of viewers, the ability to view and hear two versions of a video program, such as a child friendly version and an adult version, during a single showing of the video program.

SUMMARY

In accordance with one embodiment, a method and system for providing individualized video program content includes a system for providing individualized video program content whereby currently available synchronized active shutter technology, such as is implemented in currently available 3-D televisions, and multiple channel audio technology, such as stereo, or 5:1 surround sound technology, is modified to provide two or more synchronized and interlaced versions of at least a portion of a video program such that two or more "classes", or types of viewers, can virtually simultaneously view separate versions of the portion of the video program in a single run of the video program, i.e., in the same viewing of the program by both types of viewers.

In one embodiment, the modified synchronized active shutter and multiple channel audio technology is used to provide two synchronized video streams and two distinct audio channels associated with at least a portion of a video program, typically a portion of a video program deemed inappropriate for a given class of viewer, such as children. In one embodiment, a first viewer, or a first class of viewers, is shown a first video component and hears a first audio component associated with a first version of the portion of the video program in the first synchronized video stream and first audio channel while the second viewer, or second class of viewers, is virtually simultaneously shown a second video component and hears a second audio component associated with a second version of the portion of the video program in the second synchronized video stream and audio channel. In one embodiment, video components and audio components associated with a given video program that are considered to be appropriate for both sets of viewers, herein referred to as common content, are presented to both classes of viewers simultaneously.

In one embodiment, using modified synchronized active shutter technology, a video unit, such as a 3-D TV, and/or a multi-channel audio unit, transmits one or more video and/or audio synchronization signals that determine a frequency at which one or more video receiving units, such as active shutter 3-D glasses, and one or more audio receiving units, such as multi-channel headphone set, switch between the first synchronized video stream and first audio channel and the second synchronized video stream and second audio channel.

In one embodiment, each of the first class of viewers are provided a first viewer video unit and a first viewer audio unit that, using the video and/or audio synchronization signals, provide the first viewers with only the first video and audio components from the first synchronized video stream and first audio channel. Similarly, in one embodiment, each of the second class of viewers are provided a second viewer video unit and a second viewer audio unit that use the video and/or audio synchronization signals to provide the second viewers with only the second video and audio components from the second synchronized video stream and second audio channel. Consequently, each class, or type, of viewer, is virtually simultaneously provided a separate version of the portion of the video program that is appropriate to that class of viewer.

Using the method and system for providing individualized video program content discussed herein, different classes, or types of viewers, such as children and adults, are provided a separate version of a video program that is appropriate to that class of viewer at virtually the same time, and in a single presentation of the video program. Consequently, using the method and system for providing individualized video program content discussed herein, families are provided the ability to view a video program together, as a family, without compromising program content for the adults or exposing children to inappropriate content. Therefore, the method and system for providing individualized video program content discussed herein provides families with more entertainment options and more opportunities to take part in activities that include the entire family.

As discussed in more detail below, using the below embodiments, with little or no modification and/or user/consumer input, there is considerable flexibility, adaptability, and opportunity for customization to meet the specific needs of various users/consumers under numerous circumstances.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

Hardware System Architecture

In accordance with one embodiment, a method and system for providing individualized video program content includes a system for providing individualized video program content whereby currently available synchronized active shutter technology, such as is implemented in currently available 3-D televisions, and multiple channel audio technology, such as stereo, or 5:1 surround sound technology, is modified to provide two or more synchronized versions of at least a portion of a video program such that two or more "classes", or types of viewers, can virtually simultaneously view separate versions of the portion of the video program in a single run of the video program, i.e., in the same viewing of the program by both types of viewers.

In one embodiment, the modified synchronized active shutter and multiple channel audio technology is used to provide two synchronized video streams and two distinct audio channels associated with at least a portion of a video program, typically a portion of a video program deemed inappropriate for a given class of viewer, such as a child. In one embodiment, a first viewer, or a first class of viewers, is shown a first video component and hears a first audio component associated with a first version of the portion of the video program in the first synchronized video stream and first audio channel while the second viewer, or second class of viewers, is virtually simultaneously shown a second video component and hears a second audio component associated with a second version of the portion of the video program in the second synchronized video stream and audio channel. In one embodiment, video components and audio components associated with a given video program that are considered to be appropriate for both sets of viewers, herein referred to as common content, are presented to both classes of viewers simultaneously.

In one embodiment, using modified synchronized active shutter technology, a video unit, such as a 3-D TV, and/or a multi-channel audio unit, transmits one or more video and/or audio synchronization signals that determine a frequency at which one or more video receiving units, such as active shutter 3-D glasses, and one or more audio receiving units, such as multi-channel headphone set, switch between the first synchronized video stream and first audio channel and the second synchronized video stream and second audio channel.

In one embodiment, each of the first class of viewers are provided a first viewer video unit and a first viewer audio unit that, using the video and/or audio synchronization signals provide the first viewers with only the first video and audio components from the first synchronized video stream and first audio channel. Similarly, in one embodiment, each of the second class of viewers are provided a second viewer video unit and a second viewer audio unit that use the video and/or audio synchronization signals to provide the second viewers with only the second video and audio components from the second synchronized video stream and second audio channel. Consequently, each class, or type, of viewer, is virtually simultaneously provided a separate version of the portion of the video program that is appropriate to that class of viewer.

Figure 1:
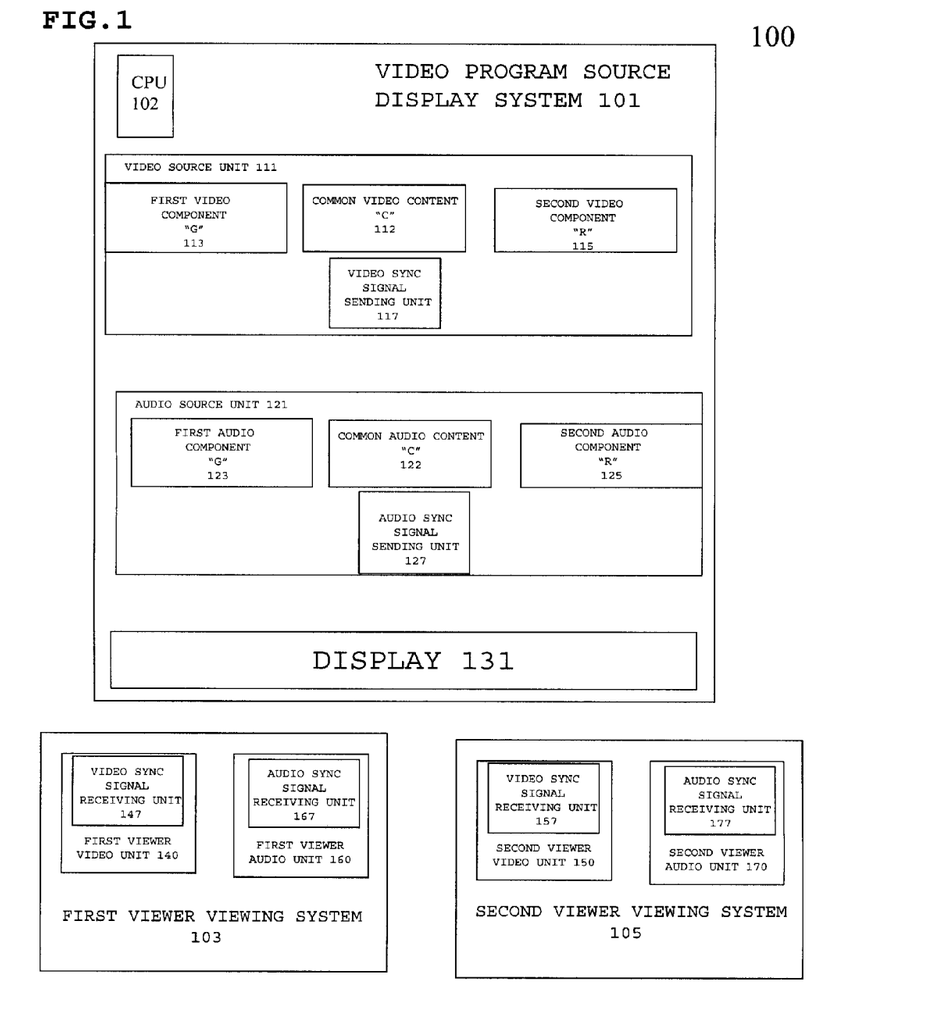
FIG. 1 is a block diagram of an exemplary system for providing individualized video program content in accordance with one embodiment.

FIG. 1 is a block diagram of an exemplary system for providing individualized video program content 100 for implementing one embodiment of a method for providing individualized video program content, such as exemplary process 400, discussed herein, that includes: a video program source display system 101, including a central processing unit CPU 102, a video source unit 111, and an audio source unit 121; a first viewer viewing system 103, including a first viewer video unit 140 and a first viewer audio unit 160; and a second viewer video program viewing system 105, including a second viewer video unit 150 and a second viewer audio unit 170.

In one embodiment, system for providing individualized video program content 100 includes modified active shutter video technology and multi-channel audio technology.

Standard, or currently available, active shutter technology uses a special 3-D TV and special 3-D viewing glasses that have a Liquid Crystal Display (LCD) in the lenses that can individually be blanked, or "shuttered", at a given frequency by a video synchronization signal provided through the 3-D TV.

Currently available active shutter systems are typically synchronized to block out, or shutter, one of the LCD lenses of each of the 3-D viewing glasses at a time, i.e., one eye at a time, while the 3-D TV displays the image for the un-shuttered lens/eye. Using currently available active shutter systems, the video synchronization signal causes the alternate shuttering of the lenses, one at a time, to occur at a frequency that provides only a single video frame, or picture, to each lens/eye of each set of 3-D viewing glasses at a time.

Using currently available active shutter systems, the video synchronization signal causes each set of 3-D viewing glasses to shutter, or alternate lenses, at more or less the same frequency. In this way, each viewer sees the same 3-D image at more or less the same time.

In one embodiment, system for providing individualized video program content 100 implements a modified active shutter technology that uses a special video program source display system 101, typically a 3-D TV, and special viewer video units 140 and 150, typically 3-D viewing glasses, that also have a Liquid Crystal Display (LCD) in the lenses that can be blanked, or "shuttered", at a given frequency by one or more video synchronization signals provided through video sync signal sending unit 117 of video program source display system 101. However, unlike current systems, in one embodiment, the one or more synchronization signals generated cause both lenses of a given first type, or first class, of viewer video unit, such as first viewer video unit 140, to be shuttered at a first time and both lenses of a given second type, or second class, of viewer video unit, such as second viewer video unit 150, be shuttered at a second time, such that, instead of alternating the shuttering of single lenses of all viewer video units at the time, as is currently done, entire viewer video units, i.e., both lenses, of each class of viewer video unit are shuttered at alternating times.

In this way, in one embodiment, a first class of video viewing unit, such as first viewer video unit 140, is synchronized to block out, or shutter, both of the LCD lenses, and both viewer eyes, while, at the same time, the second class of video viewing unit, such as second viewer video unit 150, is synchronized to open both of the LCD lenses, and both viewer eyes. As a result, the two classes of viewer video units provide two classes of viewers alternating shuttering of both eyes.

In one embodiment, first viewer and second viewer viewing systems 103 and/or 105 include video sync signal receiving units 147 and 157, respectively, for receiving video synchronization signals from video sync signal unit 117 of video source unit 111.

In one embodiment, the one or more video synchronization signals cause the alternating complete shuttering of the video units, such as first viewer video unit 140 and second viewer video unit 150, to occur at a frequency that provides only a single video frame, or picture, to each video unit, such as first viewer video unit 140 and second viewer video unit 150, at a time. In one embodiment, two video streams, that include two different video components, such as video components 113 and 115 of video source unit 111, are thereby created, displayed, and synchronized, such that the frames from a first video stream, or first video frame stream, are alternated, or interlaced, with frames from a second video stream, or second video frame stream. Then, each video unit, such as first viewer video unit 140 and second viewer video unit 150, is provided only the video frames, or video component, from one of the two video streams and the video frames, or video component, from the other video stream is shuttered, or blanked.

In addition, in one embodiment, system for providing individualized video program content 100 includes modified multi-channel audio technology whereby at least two audio channels are provided, such as through a stereo, 5:1, or 7:1, audio system.

Currently available multi-channel audio systems provide individual components of audio on each of the available channels. Then the user is provided the audio component on each channel at the same time to provide a "stereo" or "surround sound" effect.

In contrast, in one embodiment, a first audio channel is designated to provide a first audio component, such as first audio component "G" 123 of audio source unit 121, associated with a first version of at least a portion of a video program, such as first video component "G" 113 of video source unit 111 and a second audio component, such as second audio component "R" 125 of audio source unit 121, associated with a second version of the at least a portion of the video program, such as second video component "R" 115 of video source unit 111.

In one embodiment, the first class of viewers is provided a first viewer audio unit 160 as part of first viewer viewing system 103 and the second class of viewers is provided a second viewer audio unit 170 as part of second viewer viewing system 105. In one embodiment, first viewer and/or second viewer viewing systems 103 and/or 105 are multi-channel headphone systems, such as stereo headphone systems. In one embodiment, first viewer and/or second viewer viewing systems 103 and/or 105 include audio sync signal receiving units 167 and 177, respectively, for receiving audio synchronization signals from audio sync signal unit 127 of audio source unit 121.

In one embodiment, one or more audio synchronization signals are provided by audio sync signal unit 127 of audio source unit 121 such that a first audio component, such as first audio component "G" 123 of audio source unit 121, associated with a first video component, such as first video component "G" 113 of video source unit 111, is provided on the first audio channel to a first viewer audio unit, such as first viewer audio unit 160, while the second audio channel is simultaneously blanked at the first viewer audio unit, such as first viewer audio unit 160.

In one embodiment, one or more audio synchronization signals are provided by audio sync signal unit 127 of audio source unit 121 such that a second audio component, such as the second audio component "R" 125 of audio source unit 121, associated with a second video component, such as second video component "R" 115 of video source unit 111, is provided on the second audio channel to a second viewer audio unit, such as second viewer audio unit 170 while the first audio channel is simultaneously blanked.

In this way, in one embodiment, a first class of viewers using a first viewer viewing system, such as first viewer viewing system 103, is provided a first video component, such as first video component "G" 113, and a matching first audio component, such as first audio component "G" 123 that is associated with a first version of at least a portion of a video program, while being blocked from seeing/hearing a second video component, such as second video component "R" 115, and a matching second audio component, such as second audio component "R" 125, that is associated with a second version of the at least a portion of the video program.

Likewise, in one embodiment, at virtually the same time, a second class of viewers using a second viewer viewing system, such as second viewer viewing system 105, is provided a second video component, such as second video component "R" 115, and a matching second audio component, such as second audio component "R" 125, that is associated with a second version of the at least a portion of the video program while being blocked from seeing/hearing a first video component, such as first video component "G" 113, and a matching first audio component, such as first audio component "G" 123, that is associated with a first version of the at least a portion of the video program.

In one embodiment, common video and audio components, such as common video content "C" 112 and common audio content "C" 122, are provided to both first viewer viewing system 103 and second viewer viewing system 105 simultaneously.

As seen in FIG. 1, video program source display system 101 includes a central processing unit CPU 102, a video source unit 111, and an audio source unit 121.

In one embodiment, video program source display system 101 is a 3-D TV or any other active shutter video program source system, as discussed herein, and/or as known in the art at the time of filing, and/or as developed after the time of filing.

Herein, the term "video program" includes any visual program such as, but not limited to, a movie, a television show, or any program that includes at least a video component. In various embodiments, the video program can be embodied in/received via one or more media/formats, such as, but not limited to: DVD; Blu-ray disk; cable; satellite; digital download; from one or more computing systems and/or portable devices; and/or from any other source of video data as discussed herein, and/or as known in the art at the time of filing, and/or as developed after the time of filing.

In one embodiment, video source unit 111 includes two or more video components, such as first video component "G" 113, second video component "R" 115, and common video content "C" 112, associated with two or more versions of at least a portion of a video program.

In one embodiment, the portion of the video program presented in multiple versions, such as first video component "G" 113 and second video component "R" 115, is typically a portion of a video program deemed inappropriate for a given class of viewer, such as a child. On the other hand, part of the video program, such as common video content "C" 112, is appropriate for all classes of viewer.

In one embodiment, video source unit 111 includes video sync signal sending unit 117 for generating and transmitting one or more video synchronization signals to video sync signal receiving units of viewer video units, such as video sync signal receiving units 147 and 157 of first viewer video unit 140 and second viewer video unit 150. As noted above, the one or more video synchronization signals generated and transmitted by video sync signal sending unit 117 cause both lenses of a given first type, or first class, of viewer video unit, such as first viewer video unit 140, to be shuttered at a time and both lenses of a given second type, or second class, of viewer video unit, such as second viewer video unit 150, be shuttered at a time, such that, instead of alternating the shuttering of single lenses of all viewer video units at the time, as is currently done, entire viewer video units, i.e., both lenses, of each class of viewer video unit are shuttered at alternating times.

In one embodiment, any part of the video program, such as common video content "C" 112, that is considered appropriate for all classes of viewer, is viewed by both viewer classes simultaneously.

In one embodiment, video source unit 111 includes two or more audio components, such as first audio component "G" 123, second audio component "R" 125, and common audio content "C" 122, associated with the two or more versions of the at least a portion of the video program, such as first video component "G" 113 and second video component "R" 115.

In one embodiment, video source unit 111 includes audio sync signal sending unit 127 for generating and transmitting one or more audio synchronization signals to audio sync signal receiving units of viewer audio units, such as audio sync signal receiving units 167 and 177 of first viewer audio unit 160 and second viewer audio unit 170. As noted above, the one or more audio synchronization signals generated and transmitted by audio sync signal sending unit 127 cause a first class of viewer audio unit, such as first viewer audio unit 160, to receive audio content, such as first audio component "G" 123, on a first audio channel, and a second class of viewer audio unit, such as second viewer audio unit 170, to receive audio content, such as second audio component "R" 125, on a second audio channel.

In one embodiment, any part of the audio associated with the video program, such as common audio content "C" 122, that is considered appropriate for all classes of viewer, is heard on both channels, or on all channels, by both viewer classes simultaneously.

As seen in FIG. 1, video program source display system 101 also includes display 131. In various embodiments, display 131 is any display device as discussed herein, and/or as known in the art at the time of filing, and/or as developed after the time of filing.

In one embodiment, system for providing individualized video program content 100 includes first viewer viewing system 103. In one embodiment, first viewer viewing system 103 includes first viewer video unit 140. In one embodiment, first viewer video unit 140 is a pair of 3-D viewing glasses, or any other form of active shutter viewing device as discussed herein, and/or as known in the art at the time of filing, and/or as developed after the time of filing.

As noted above, first viewer video unit 140 includes video sync signal receiving unit 147 for receiving a video synchronization signal from video sync signal sending unit 117. As also noted above, in one embodiment, the synchronization signal causes both lenses of first viewer video unit 140 to be shuttered at a time such that, instead of alternating the shuttering of single lenses as is currently done, both lenses of first viewer video unit 140 are shuttered to provide a first video component, such as first video component "G" 113, to a first viewer using first viewer video unit 140.

In one embodiment, first viewer viewing system 103 includes first viewer audio unit 160. In one embodiment, first viewer audio unit 160 is a pair of multi-channel headphones, or any other multiple audio channel devices as discussed herein, and/or as known in the art at the time of filing, and/or as developed after the time of filing.

As noted above, first viewer audio unit 160 includes audio sync signal receiving unit 167 for receiving an audio synchronization signal from audio sync signal sending unit 127. As also noted above, in one embodiment, the synchronization signal causes first viewer audio unit 160 to receive audio content, such as first audio component "G" 123, on a first audio channel.

In one embodiment, system for providing individualized video program content 100 includes second viewer viewing system 105. In one embodiment, second viewer viewing system 105 includes second viewer video unit 150. In one embodiment, second viewer video unit 150 is a pair of 3-D viewing glasses, or any other form of active shutter viewing device as discussed herein, and/or as known in the art at the time of filing, and/or as developed after the time of filing.

As noted above, second viewer video unit 150 includes video sync signal receiving unit 157 for receiving a video synchronization signal from video sync signal sending unit 117. As also noted above, in one embodiment, the synchronization signal causes both lenses of second viewer video unit 150 to be shuttered at a time such that, instead of alternating the shuttering of single lenses as is currently done, both lenses of second viewer video unit 150 are shuttered to provide a second video component, such as second video component "R" 115, to a second viewer using second viewer video unit 150.

In one embodiment, second viewer viewing system 105 includes second viewer audio unit 170. In one embodiment, second viewer audio unit 170 is a pair of multi-channel headphones, or any other multiple audio channel devices as discussed herein, and/or as known in the art at the time of filing, and/or as developed after the time of filing.

As noted above, second viewer audio unit 170 includes audio sync signal receiving unit 177 for receiving an audio synchronization signal from audio sync signal sending unit 127. As also noted above, in one embodiment, the synchronization signal causes second viewer audio unit 170 to receive audio content, such as second audio component "R" 125 on a second audio channel.

Figure 2:
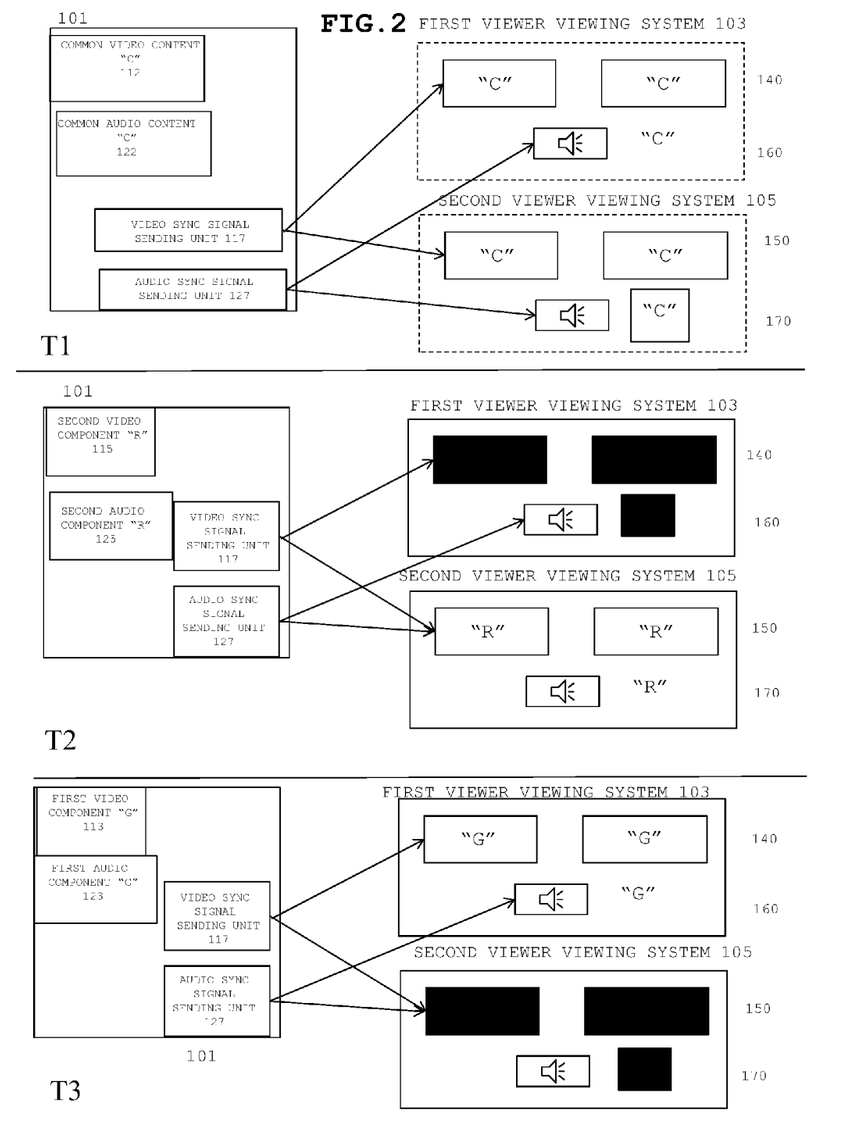
FIG. 2 is a block diagram depicting the synchronization and receipt of first and second video and audio versions of a video program in accordance with one embodiment.

FIG. 2 is a block diagram depicting the transmission, synchronization, and receipt of: first and second video components, such as first video component "G" 113 and second video component "R" 115 of FIG. 1, by first and second viewer video units 140 and 150 of FIG. 1; first and second audio components, such as first audio component "G" 123 and second audio component "R" 125 of FIG. 1, by first and second viewer audio units 160 and 170 of FIG. 1 at distinct times T1, T2, and T3.

As seen in FIG. 2, at time T1, common video content "C" 112, and associated common audio content "C" 122, of video source unit 111 (FIG. 1) is displayed by video program source display system 101.

As noted above, common content is both video and audio content that is considered acceptable for all classes of viewers. Consequently, at time T1, video sync signal sending unit 117 sends out a video synchronization signal, or, in one embodiment, no video synchronization signal, such that common video content "C" 112 is displayed to both first viewer video unit 140 and second viewer video unit 150 as video content "C" in both lenses of first viewer video unit 140 and second viewer video unit 150.

Likewise, at time T1, audio sync signal sending unit 127 sends out an audio synchronization signal, or, in one embodiment, no audio synchronization signal, such that common audio content "C" 122 is heard by both first viewer audio unit 160 and second viewer audio unit 170.

In many instances, the majority of video and audio content associated with a given video program will be content appropriate for all viewers and, therefore, the majority of the time the situation shown in FIG. 2 as time T1 will apply.

However, in some instances, a portion of a video program may contain scenes that are inappropriate for one of the viewer classes. For instance, a portion of an otherwise age independent video program may contain violence, nudity, inappropriate language, etc. In these instances, in one embodiment, a first version of the objectionable portion of the video program is created that is child friendly, or "G" rated, and includes a first, "G" rated video component, such as first video component "G" 113, and an associated first, "G" rated audio component, such as first audio component "G" 123.

Likewise, in one embodiment, a second version of the objectionable portion of the video program is created that is adult, or "R" rated, and includes a second, "R" rated video component, such as second video component "R" 115, and an associated second, "R" rated audio component, such as second audio component "R" 125.

In various embodiments, the child and adult versions are created before, during, or after the creation of the original video program and are provided to video program source display system 101 (FIG. 1) by any of the means, or media, discussed herein, and/or as known in the art at the time of filing, and/or as developed after the time of filing.

In one embodiment, when the objectionable portion of the video program is to be displayed, video sync signal sending unit 117 generates a video synchronization signal such that at time T2, both lenses of first viewer video unit 140 are shuttered to blank out a first frame of second video component "R" 115 from a first class of viewer, such as a child viewer wearing first viewer video unit 140, while, at the same time T2, both lenses of second viewer video unit 150 are shuttered open to display the first frame of second video component "R" 115 to a second class of viewer, such as an adult viewer wearing second viewer video unit 150.

Likewise, when the objectionable portion of the video program is to be displayed with an accompanying audio component, audio sync signal sending unit 127 generates an audio synchronization signal such that at time T2, second audio component "R" 125 is provided to the second class of viewer on a second audio channel of second viewer audio unit 170 while, at the same time, the second audio channel, and second audio component "R" 125, is blocked from first viewer audio unit 160.

Then, at time T3, video sync signal sending unit 117 generates a video synchronization signal such that both lenses of first viewer video unit 140 are shuttered open to display the first frame of first video component "G" 113 to the first class of viewer, such as a child viewer wearing first viewer video unit 140 while, at the same time, both lenses of second video unit 150 are shuttered to blank out the first frame of first video component "G" 113 from a second class of viewer, such as an adult viewer wearing second viewer video unit 150.

Likewise, when the objectionable portion of the video program is to be displayed with an accompanying audio component, audio sync signal sending unit 127 generates an audio synchronization signal such that at time T3, first audio component "G" 123 is provided to the first viewer on a first audio channel of first viewer audio unit 160 while, at the same time, the first audio channel, and first audio component "G" 123, is blocked from second viewer audio unit 170.

As noted above, in one embodiment, the situation depicted for times T2 and T3 in FIG. 2 is repeated, alternately, for each frame of first video component "G" 113 and second video component "R" 115 until the end of the objectionable portion of the video program is reached and/or common content is again obtained.

As also noted above, referring to FIGS. 1 and 2 together, unlike current systems, in one embodiment, the one or more synchronization signals generated cause both lenses of a given first type, or first class, of viewer video unit, such as first viewer video unit 140, to be shuttered at a time, such as times T2 and T3, and both lenses of a given second type, or second class, of viewer video unit, such as second viewer video unit 150, be shuttered at a time, such as times T3 and T2, such that, instead of alternating the shuttering of single lenses of all viewer video units at the time, as is currently done, entire viewer video units, i.e., both lenses, of each class of viewer video unit are shuttered at alternating times.

In this way, in one embodiment, a first class of video viewing unit, such as first viewer video unit 140, is synchronized to block out, or shutter, both of the LCD lenses, and both viewer eyes, while, at the same time, the second class of video viewing unit, such as second viewer video unit 150, is synchronized to open both of the LCD lenses, and both viewer eyes. As a result, the two classes of viewer video units provide two classes of viewers alternating shuttering of both eyes.

In one embodiment, the one or more video synchronization signals cause the alternating complete shuttering of the video units, such as first viewer video unit 140 and second viewer video unit 150, to occur at a frequency that provides only a single video frame, or picture, to each video unit, such as first viewer video unit 140 and second viewer video unit 150, at a time, such as times T2 and T3. In one embodiment, two video streams, that include two different video components, such as video components 113 and 115 of video source unit 111, are thereby created, displayed, and synchronized, such that the frames from a first video stream, or video frame stream, are alternated, or interlaced, with frames from a second video stream, or video frame stream. Then, each video unit, such as first viewer video unit 140 and second viewer video unit 150, is provided only the video frames, or video component, from one of the two video streams and the video frames, or video component, from the other video stream is shuttered, or blanked.

Figure 3:
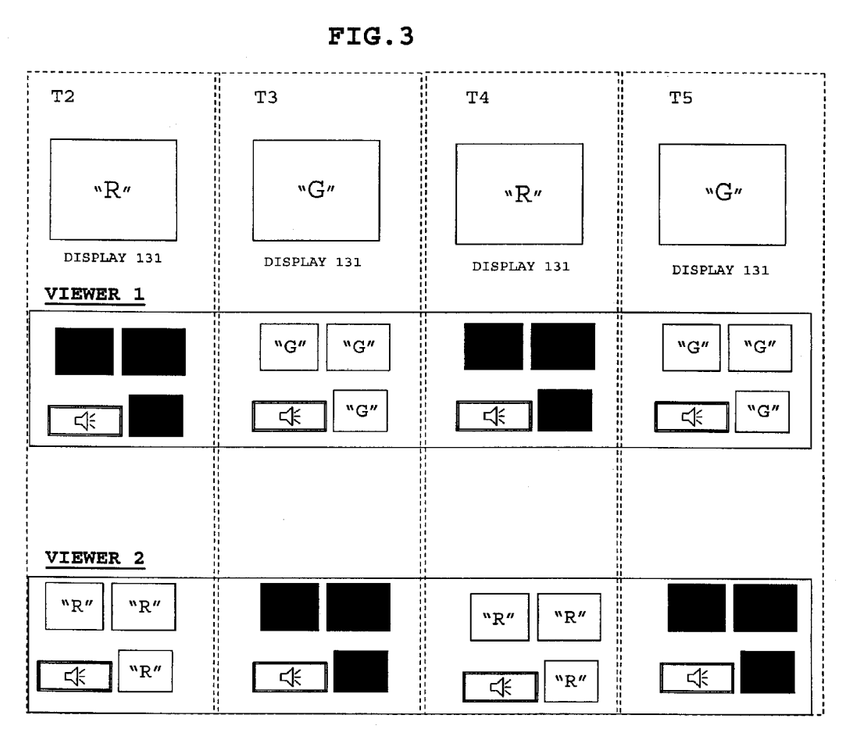
FIG. 3 is a block diagram depicting first and second video and audio versions of a video program received by first and second viewers in accordance with one embodiment.

FIG. 3 is a block diagram depicting first and second video and audio versions of a video program alternatively displayed on a display of a video program source display system and received by first and second viewers in accordance with one embodiment over times T2, T3, T4, and T5.

Referring to FIGS. 2 and 3 together, at time T2, when a first frame of second video component "R" 115 is displayed on display 131 (FIG. 1), both lenses of first viewer video unit 140 are shuttered to blank out the first frame of second video component "R" 115 from a first class of viewer, such as a child viewer wearing first viewer video unit 140, while, at the same time T2, both lenses of second viewer video unit 150 are shuttered open to display the first frame of second video component "R" 115 to a second class of viewer, such as an adult viewer wearing second viewer video unit 150.

Likewise, when the objectionable portion of the video program is to be displayed with an accompanying audio component, audio sync signal sending unit 127 generates an audio synchronization signal such that at times T2 and T4, second audio component "R" 125 is provided to the second class of viewer on a second audio channel of second viewer audio unit 170 while, at the same time, the second audio channel, and second audio component "R" 125, is blocked from first viewer audio unit 160.

Then, at time T3, when a first frame of first video component "G" 113 is displayed on display 131 (FIG. 1), video sync signal sending unit 117 generates a video synchronization signal such that both lenses of first viewer video unit 140 are shuttered open to display the first frame of first video component "G" 113 to the first class of viewer, such as a child viewer wearing first viewer video unit 140 while, at the same time, both lenses of second video unit 150 are shuttered to blank out the first frame of first video component "G" 113 from a second class of viewer, such as an adult viewer wearing second viewer video unit 150.

Likewise, when the objectionable portion of the video program is to be displayed with an accompanying audio component, audio sync signal sending unit 127 generates an audio synchronization signal such that at times T3 and T5, first audio component "G" 123 is provided to the first viewer on a first audio channel of first viewer audio unit 160 while, at the same time, the first audio channel, and first audio component "G" 123, is blocked from second viewer audio unit 170.

At time T4, when a second frame of second video component "R" 115 is displayed on display 131 (FIG. 1), both lenses of first viewer video unit 140 are again shuttered to blank out the second frame of second video component "R" 115 from the first class of viewer, such as a child viewer wearing first viewer video unit 140, while, at the same time T4, both lenses of second viewer video unit 150 are again shuttered open to display the second frame of second video component "R" 115 to the second class of viewer, such as an adult viewer wearing second viewer video unit 150.

Likewise, when the objectionable portion of the video program is to be displayed with an accompanying audio component, audio sync signal sending unit 127 generates an audio synchronization signal such that at times T2 and T4, second audio component "R" 125 is provided to the second class of viewer on a second audio channel of second viewer audio unit 170 while, at the same time, the second audio channel, and second audio component "R" 125, is blocked from first viewer audio unit 160.

Then, at time T5, when a second frame of first video component "G" 113 is displayed on display 131 (FIG. 1), video sync signal sending unit 117 generates a video synchronization signal such that both lenses of first viewer video unit 140 are again shuttered open to display the second frame of first video component "G" 113 to the first class of viewer, such as a child viewer wearing first viewer video unit 140 while, at the same time, both lenses of second video unit 150 are again shuttered to blank out the second frame of first video component "G" 113 from a second class of viewer, such as an adult viewer wearing second viewer video unit 150.

Likewise, when the objectionable portion of the video program is to be displayed with an accompanying audio component, audio sync signal sending unit 127 generates an audio synchronization signal such that at times T3 and T5, first audio component "G" 123 is provided to the first viewer on a first audio channel of first viewer audio unit 160 while, at the same time, the first audio channel, and first audio component "G" 123, is blocked from second viewer audio unit 170.

As noted above, in one embodiment, the situation depicted for times T2, T4 and T3, T5 in FIG. 3 is repeated, alternately, for each frame of first video component "G" 113 and second video component "R" 115 until the end of the objectionable portion of the video program is reached and common content is again obtained.

Using system for providing individualized video program content 100, different classes, or types of viewers, such as children and adults, are provided a separate version of a video program that is appropriate to that class of viewer at virtually the same time, and in a single presentation of the video program. Consequently, using system for providing individualized video program content 100, families are provided the ability to view a video program together, as a family, without compromising video content for the adults or exposing children to inappropriate content. Therefore, system for providing individualized video program content 100 provides families with more entertainment options and more opportunities to take part in activities that include the entire family.

Those of skill in the art will readily recognize that the components shown in FIG. 1 and their respective sub-components, are shown for illustrative purposes only and that architectures with more or fewer components can implement, and benefit from, the invention.

Process

In accordance with one embodiment, a method and system for providing individualized video program content includes a system for providing individualized video program content whereby currently available synchronized active shutter technology, such as is implemented in currently available 3-D televisions, and multiple channel audio technology, such as stereo, or 5:1 surround sound technology, is modified to provide two or more synchronized versions of at least a portion of a video program such that two or more "classes", or types of viewers, can virtually simultaneously view separate versions of the portion of the video program in a single run of the video program, i.e., in the same viewing of the program by both types of viewers.

In one embodiment, the modified synchronized active shutter and multiple channel audio technology is used to provide two synchronized video streams and two distinct audio channels associated with at least a portion of a video program, typically a portion of a video program deemed inappropriate for a given class of viewer, such as a child. In one embodiment, a first viewer, or a first class of viewers, is shown a first video component and hears a first audio component associated with a first version of the portion of the video program in the first synchronized video stream and first audio channel while the second viewer, or second class of viewers, is virtually simultaneously shown a second video component and hears a second audio component associated with a second version of the portion of the video program in the second synchronized video stream and audio channel. In one embodiment, video components and audio components associated with a given video program that are considered to be appropriate for both sets of viewers, herein referred to as common content, are presented to both classes of viewers simultaneously.

In one embodiment, using modified synchronized active shutter technology, a video unit, such as a 3-D TV, and/or a multi-channel audio unit, transmits one or more video and/or audio synchronization signals that determine a frequency at which one or more video receiving units, such as active shutter 3-D glasses, and one or more audio receiving units, such as multi-channel headphone set, switch between the first synchronized video stream and first audio channel and the second synchronized video stream and second audio channel.

In one embodiment, each of the first class of viewers are provided a first viewer video unit and a first viewer audio unit that, using the video and/or audio synchronization signals provide the first viewers with only the first video and audio components from the first synchronized video stream and first audio channel. Similarly, in one embodiment, each of the second class of viewers are provided a second viewer video unit and a second viewer audio unit that use the video and/or audio synchronization signals to provide the second viewers with only the second video and audio components from the second synchronized video stream and second audio channel. Consequently, each class, or type, of viewer, is virtually simultaneously provided a separate version of the portion of the video program that is appropriate to that class of viewer.

Figure 4:
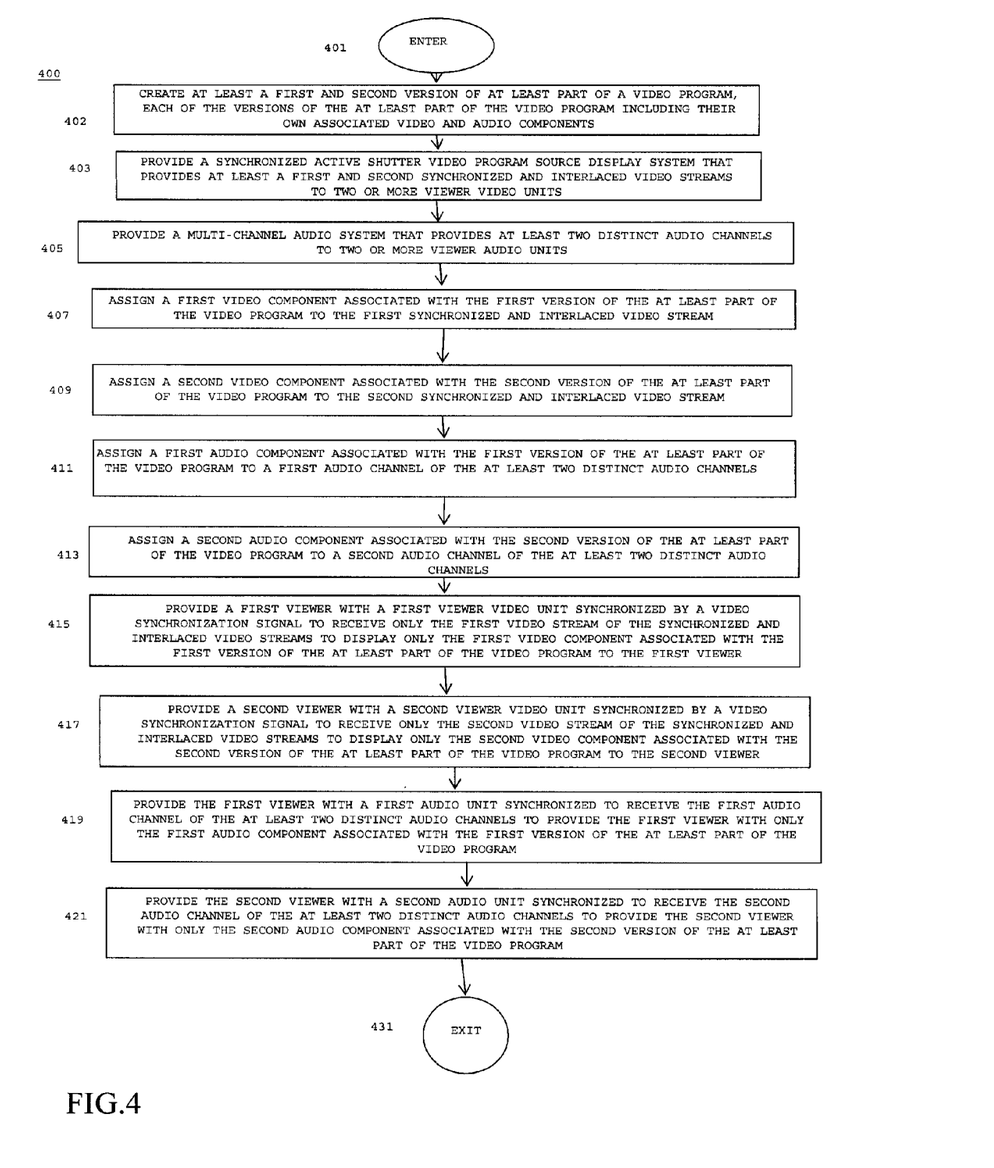
FIG. 4 is a flow chart depicting a process for providing individualized video program content in accordance with one embodiment.

FIG. 4 a flow chart depicting a process for providing individualized video program content 400 in accordance with one embodiment.

Process for providing individualized video program content 400 begins at ENTER OPERATION 401 of FIG. 4 and process flow proceeds to CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, at CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 data representing a first version of at least a portion of a video program, that includes a first video component and an associated first audio component, and a second version of at least a portion of a video program, that includes a second video component and an associated second audio component, is created and provided to a video program source display system.

Herein, the term "video program" includes any visual program such as, but not limited to, a movie, a television show, or any program that includes at least a video component. In various embodiments, the video program can be embodied in/received via one or more media/formats, such as, but not limited to: DVD; Blu-ray disk; cable; satellite; digital download; from one or more computing systems and/or portable devices; and/or from any other source of video data as discussed herein, and/or as known in the art at the time of filing, and/or as developed after the time of filing.

In one embodiment, the portion of the video program created and provided in multiple versions at CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 is typically a portion of a video program deemed inappropriate for a given class of viewer, such as a child. In various embodiments, child and adult versions of the portion of the video program are created before, during, or after the creation of the original video program and are provided to a video program source display system, such as video program source display system 101 of FIG. 1, by any of the means, or media, discussed herein, and/or as known in the art at the time of filing, and/or as developed after the time of filing.

Returning to FIG. 4, in one embodiment, at CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 the data representing the first version of the at least a portion of the video program includes a first video component, such as first video component "G" 113 of FIGS. 1 and 2, and a first audio component, such as first audio component "G" 123 of FIGS. 1 and 2.

Returning to FIG. 4, in one embodiment, at CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 the data representing the second version of the at least a portion of the video program includes a second video component, such as second video component "R" 115 of FIGS. 1 and 2, and a second audio component, such as second audio component "R" 125 of FIGS. 1 and 2.

Returning to FIG. 4, in one embodiment, once data representing a first version of at least a portion of a video program, that includes a first video component and an associated first audio component, and a second version of at least a portion of a video program, that includes a second video component and an associated second audio component, is created and provided to a video program source display system at CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402, process flow proceeds to PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403.

In one embodiment, at PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403 a video program source display system is provided that uses one or more synchronization signals to provide at least a first and second synchronized and interlaced video streams to two or more viewer video units.

In one embodiment, the video program source display system provided at PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403 is a video program source display system such as video program source display system 100 of FIG. 1.

Returning to FIG. 4, in one embodiment, the video program source display system is an active shutter 3-D TV display system.

In one embodiment, the video program source display system provides one or more video synchronization signals to two or more viewer video units, such as first viewer video unit 140 and second viewer video unit 150 of FIG. 1.

Returning to FIG. 4, in one embodiment, the two or more viewer video units are 3-D viewing glasses that have a Liquid Crystal Display (LCD) in the lenses that can be blanked, or "shuttered", at a given frequency by the one or more video synchronization signals provided through a video sync signal sending unit associated with the video program source display system, such as video sync signal sending unit 117 of video program source display system 101 of FIG. 1. However, unlike current systems, in one embodiment, the one or more synchronization signals generated cause both lenses of a given first type, or first class, of viewer video unit, such as first viewer video unit 140 of FIG. 1, to be shuttered at a time and both lenses of a given second type, or second class, of viewer video unit, such as second viewer video unit 150 of FIG. 1, be shuttered at a time, such that, instead of alternating the shuttering of single lenses of all viewer video units at the time, as is currently done, entire viewer video units, i.e., both lenses, of each class of viewer video unit are shuttered at alternating times.

Consequently, in one embodiment, a first class of video viewing unit, such as first viewer video unit 140 of FIG. 1, is synchronized to block out, or shutter, both of the LCD lenses, and both viewer eyes, while, at the same time, the second class of video viewing unit, such as second viewer video unit 150 of FIG. 1, is synchronized to open both of the LCD lenses, and both viewer eyes. As a result, the two classes of viewer video units provide two classes of viewers alternating shuttering of both eyes.

Returning to FIG. 4, in one embodiment, the first viewer and second viewer video units include video sync signal receiving units, such as video sync signal receiving units 147 and 157 of FIG. 1, for receiving the video synchronization signals from the video program source display system of PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403 (FIG. 4).

In one embodiment, the one or more video synchronization signals cause the alternating complete shuttering of the video units, such as first viewer video unit 140 and second viewer video unit 150 of FIG. 1, to occur at a frequency that provides only a single video frame, or picture, to each video unit, such as first viewer video unit 140 and second viewer video unit 150 of FIG. 1, at a time. In one embodiment, two video streams, that include two different video components, such as video components 113 and 115 of video source unit 111 of FIG. 1, are thereby created, displayed, and synchronized, at PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403 (FIG. 4) such that the frames from a first video stream, or video frame stream, are alternated, or interlaced, with frames from a second video stream, or video frame stream. Then, each viewer video unit, such as first viewer video unit 140 and second viewer video unit 150, is provided only the video frames, or video component, from one of the two video streams and the video frames, or video component, from the other video stream is shuttered, or blanked.

Returning to FIG. 4, in one embodiment, once a video program source display system is provided that uses one or more synchronization signals to provide at least a first and second synchronized and interlaced video streams to two or more viewer video units at PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403, process flow proceeds to PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405.

In one embodiment, at PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405 an audio system that includes at least two distinct audio channels is provided.

In one embodiment, at PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405 a first audio channel of the audio system is designated to provide a first audio component, such as first audio component "G" 123 of audio source unit 121 of FIGS. 1 and 2, associated with a first version of the at least a portion of a video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402, such as first video component "G" 113 of FIGS. 1 and 2.

Returning to FIG. 4, in one embodiment, at PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405 (FIG. 4) a second audio channel of the audio system is designated to provide a second audio component, such as second audio component "R" 125 of FIGS. 1 and 2, associated with a second version of the at least a portion of the video program CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402, such as second video component "R" 115 of FIGS. 1 and 2.

Returning to FIG. 4, in one embodiment, one or more audio synchronization signals are provided by an audio sync signal unit associated with audio system of PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405 and/or the video program source display system of PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403, such that a first audio component, such as first audio component "G" 123 of FIGS. 1 and 2, associated with a first video component, such as first video component "G" 113 of FIGS. 1 and 2, is provided on the first audio channel to a first viewer audio unit, such as first viewer audio unit 160 of FIGS. 1 and 2, while the second audio channel is simultaneously blanked at the first viewer audio unit, such as first viewer audio unit 160 of FIGS. 1 and 2.

Returning to FIG. 4, in one embodiment, one or more audio synchronization signals are provided by an audio sync signal unit associated with audio system of PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405 and/or the video program source display system of PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403, such that such that a second audio component, such as the second audio component "R" 125 of FIGS. 1 and 2, associated with a second video component, such as second video component "R" 115 of FIGS. 1 and 2, is provided on the second audio channel to a second viewer audio unit, such as second viewer audio unit 170 of FIGS. 1 and 2, while the first audio channel is simultaneously blanked.

In one embodiment, once an audio system that includes at least two distinct audio channels to two or more viewer audio units is provided at PROVIDE A MULTI-CHANNEL AUDIO SYSTEM THAT PROVIDES AT LEAST A FIRST AND SECOND DISTINCT AUDIO CHANNELS TO TWO OR MORE VIEWER AUDIO UNITS OPERATION 405, process flow proceeds to ASSIGN A FIRST VIDEO COMPONENT ASSOCIATED WITH THE FIRST VERSION OF THE AT LEAST PART OF THE VIDEO PROGRAM TO THE FIRST SYNCHRONIZED AND INTERLACED VIDEO STREAM OPERATION 407.

In one embodiment, at ASSIGN A FIRST VIDEO COMPONENT ASSOCIATED WITH THE FIRST VERSION OF THE AT LEAST PART OF THE VIDEO PROGRAM TO THE FIRST SYNCHRONIZED AND INTERLACED VIDEO STREAM OPERATION 407 a first video component associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 is associated with the first video stream of PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403.

As noted above, in one embodiment, a first class of video viewing unit, such as first viewer video unit 140 of FIG. 1, is synchronized to block out, or shutter, both of the LCD lenses, and both viewer eyes, while, at the same time, the second class of video viewing unit, such as second viewer video unit 150 of FIG. 1, is synchronized to open both of the LCD lenses, and both viewer eyes. As a result, the two classes of viewer video units provide two classes of viewers alternating shuttering of both eyes.

As also noted above, in one embodiment, the one or more video synchronization signals cause the alternating complete shuttering of the video units, such as first viewer video unit 140 and second viewer video unit 150 of FIGS. 1 and 2, to occur at a frequency that provides only a single video frame, or picture, to each video unit, such as first viewer video unit 140 and second viewer video unit 150 of FIGS. 1 and 2, at a time.

As a result, in one embodiment, two video streams, a first and second video stream, are created that include two different video components, such as video components 113 and 115 of video source unit 111 of FIGS. 1 and 2, such that the frames from the first video stream, or video frame stream, are alternated, or interlaced, with the frames from the second video stream, or video frame stream. In one embodiment, the first video stream is designated to include the video frames associated with the first video component that is associated with a first version of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, once the first video component is associated with the first video stream at ASSIGN A FIRST VIDEO COMPONENT ASSOCIATED WITH THE FIRST VERSION OF THE AT LEAST PART OF THE VIDEO PROGRAM TO THE FIRST SYNCHRONIZED AND INTERLACED VIDEO STREAM OPERATION 407 process flow proceeds to ASSIGN A SECOND VIDEO COMPONENT ASSOCIATED WITH THE SECOND VERSION OF THE AT LEAST PART OF THE VIDEO PROGRAM TO THE SECOND SYNCHRONIZED AND INTERLACED VIDEO STREAM OPERATION 409.

In one embodiment, at ASSIGN A SECOND VIDEO COMPONENT ASSOCIATED WITH THE SECOND VERSION OF THE AT LEAST PART OF THE VIDEO PROGRAM TO THE SECOND SYNCHRONIZED AND INTERLACED VIDEO STREAM OPERATION 409 a second video component associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 is associated with the second video stream of PROVIDE A SYNCHRONIZED ACTIVE SHUTTER VIDEO PROGRAM SOURCE DISPLAY SYSTEM THAT PROVIDES AT LEAST A FIRST AND SECOND SYNCHRONIZED AND INTERLACED VIDEO STREAMS TO TWO OR MORE VIEWER VIDEO UNITS OPERATION 403.

As noted above, in one embodiment, the one or more video synchronization signals cause the alternating complete shuttering of the video units, such as first viewer video unit 140 and second viewer video unit 150 of FIGS. 1 and 2, to occur at a frequency that provides only a single video frame, or picture, to each video unit, such as first viewer video unit 140 and second viewer video unit 150 of FIGS. 1 and 2, at a time.

As a result, in one embodiment, two video streams, a first and second video stream, are created that include two different video components, such as video components 113 and 115 of video source unit 111 of FIGS. 1 and 2, such that the frames from the first video stream, or video frame stream, are alternated, or interlaced, with the frames from the second video stream, or video frame stream. In one embodiment, the second video stream is designated to include the video frames associated with the second video component that is associated with a second version of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, once the second video component is associated with the second video stream at ASSIGN A SECOND VIDEO COMPONENT ASSOCIATED WITH THE SECOND VERSION OF THE AT LEAST PART OF THE VIDEO PROGRAM TO THE SECOND SYNCHRONIZED AND INTERLACED VIDEO STREAM OPERATION 409, process flow proceeds to ASSIGN A FIRST AUDIO COMPONENT ASSOCIATED WITH THE FIRST VERSION OF THE AT LEAST PART OF THE VIDEO PROGRAM TO A FIRST AUDIO CHANNEL OF THE AT LEAST TWO DISTINCT AUDIO CHANNELS OPERATION 411.

In one embodiment, at ASSIGN A FIRST AUDIO COMPONENT ASSOCIATED WITH THE FIRST VERSION OF THE AT LEAST PART OF THE VIDEO PROGRAM TO A FIRST AUDIO CHANNEL OF THE AT LEAST TWO DISTINCT AUDIO CHANNELS OPERATION 411 a first audio component associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 is assigned to the first audio channel of the audio system of PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405.

As noted above, in one embodiment, an audio sync signal sending unit, such as audio sync signal sending unit 127 of FIGS. 1 and 2, generates an audio synchronization signal such that a first audio component, such as first audio component "G" 123 of FIGS. 1 and 2, is provided to the first viewer on a first audio channel of a first viewer audio unit, such as first viewer audio unit 160 while, at the same time, the first audio channel, and first audio component, is blocked from a second viewer audio unit, such as second viewer audio unit 170.

In one embodiment, the first audio channel is assigned the first audio component, such as first audio component "G" 123 of FIGS. 1 and 2, associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, once a first audio component associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 is assigned to the first audio channel of the audio system of PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405 at ASSIGN A FIRST AUDIO COMPONENT ASSOCIATED WITH THE FIRST VERSION OF THE AT LEAST PART OF THE VIDEO PROGRAM TO A FIRST AUDIO CHANNEL OF THE AT LEAST TWO DISTINCT AUDIO CHANNELS OPERATION 411, process flow proceeds to ASSIGN A SECOND AUDIO COMPONENT ASSOCIATED WITH THE SECOND VERSION OF THE AT LEAST PART OF THE VIDEO PROGRAM TO A SECOND AUDIO CHANNEL OF THE AT LEAST TWO DISTINCT AUDIO CHANNELS OPERATION 413.

In one embodiment, at ASSIGN A SECOND AUDIO COMPONENT ASSOCIATED WITH THE SECOND VERSION OF THE AT LEAST PART OF THE VIDEO PROGRAM TO A SECOND AUDIO CHANNEL OF THE AT LEAST TWO DISTINCT AUDIO CHANNELS OPERATION 413 a second audio component associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 is assigned to the second audio channel of the audio system of PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405.

As noted above, in one embodiment, an audio sync signal sending unit, such as audio sync signal sending unit 127 of FIGS. 1 and 2, generates an audio synchronization signal such that a second audio component, such as second audio component "R" 125 of FIGS. 1 and 2, is provided to the second viewer on a second audio channel of a second viewer audio unit, such as second viewer audio unit 170 while, at the same time, the second audio channel, and second audio component, is blocked from the first viewer audio unit, such as first viewer audio unit 160.

In one embodiment, the second audio channel is assigned the second audio component, such as second audio component "R" 125 of FIGS. 1 and 2, associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, once a second audio component associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 is assigned to the second audio channel of the audio system of PROVIDE A MULTI-CHANNEL AUDIO SYSTEM THAT PROVIDES AT LEAST TWO DISTINCT AUDIO CHANNELS TO TWO OR MORE VIEWER AUDIO UNITS OPERATION 405 at ASSIGN A SECOND AUDIO COMPONENT ASSOCIATED WITH THE SECOND VERSION OF THE AT LEAST PART OF THE VIDEO PROGRAM TO A SECOND AUDIO CHANNEL OF THE AT LEAST TWO DISTINCT AUDIO CHANNELS OPERATION 413, process flow proceeds to PROVIDE A FIRST VIEWER WITH A FIRST VIEWER VIDEO UNIT SYNCHRONIZED BY A VIDEO SYNCHRONIZATION SIGNAL TO RECEIVE ONLY THE FIRST VIDEO STREAM OF THE SYNCHRONIZED AND INTER- LACED VIDEO STREAMS TO DISPLAY ONLY THE FIRST VIDEO COMPONENT ASSOCIATED WITH THE FIRST VERSION OF THE AT LEAST PART OF THE VIDEO PROGRAM TO THE FIRST VIEWER OPERATION 415.

In on embodiment, at PROVIDE A FIRST VIEWER WITH A FIRST VIEWER VIDEO UNIT SYNCHRONIZED BY A VIDEO SYNCHRONIZATION SIGNAL TO RECEIVE ONLY THE FIRST VIDEO STREAM OF THE SYNCHRONIZED AND INTERLACED VIDEO STREAMS TO DISPLAY ONLY THE FIRST VIDEO COMPONENT ASSOCIATED WITH THE FIRST VERSION OF THE AT LEAST PART OF THE VIDEO PROGRAM TO THE FIRST VIEWER OPERATION 415 a first viewer, or first class of viewers, is provided a first viewer video unit synchronized to provide the first viewer with only the first video steam and first video component of ASSIGN A FIRST VIDEO COMPONENT ASSOCIATED WITH THE FIRST VERSION OF THE AT LEAST PART OF THE VIDEO PROGRAM TO THE FIRST SYNCHRONIZED AND INTERLACED VIDEO STREAM OPERATION 407 associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, the first viewer, or first class of viewers, is provided a first viewer video unit, such as first viewer video unit 140 of FIGS. 1 and 2.

Returning to FIG. 4, in one embodiment, the first viewer video unit of PROVIDE A FIRST VIEWER WITH A FIRST VIEWER VIDEO UNIT SYNCHRONIZED BY A VIDEO SYNCHRONIZATION SIGNAL TO RECEIVE ONLY THE FIRST VIDEO STREAM OF THE SYNCHRONIZED AND INTERLACED VIDEO STREAMS TO DISPLAY ONLY THE FIRST VIDEO COMPONENT ASSOCIATED WITH THE FIRST VERSION OF THE AT LEAST PART OF THE VIDEO PROGRAM TO THE FIRST VIEWER OPERATION 415 is a pair of 3-D viewing glasses, or any other form of active shutter viewing device as discussed herein, and/or as known in the art at the time of filing, and/or as developed after the time of filing.

As noted above, in one embodiment, the first viewer video unit of PROVIDE A FIRST VIEWER WITH A FIRST VIEWER VIDEO UNIT SYNCHRONIZED BY A VIDEO SYNCHRONIZATION SIGNAL TO RECEIVE ONLY THE FIRST VIDEO STREAM OF THE SYNCHRONIZED AND INTERLACED VIDEO STREAMS TO DISPLAY ONLY THE FIRST VIDEO COMPONENT ASSOCIATED WITH THE FIRST VERSION OF THE AT LEAST PART OF THE VIDEO PROGRAM TO THE FIRST VIEWER OPERATION 415 includes a video sync signal receiving unit, such as video sync signal receiving unit 147 of FIG. 1, for receiving a video synchronization signal from a video sync signal sending unit, such as video sync signal sending unit 117 of FIGS. 1 and 2.

As also noted above, in one embodiment, the synchronization signal causes both lenses of the first viewer video unit to be shuttered at a time such that, instead of alternating the shuttering of single lenses, as is currently done, both lenses of the first viewer video unit are shuttered to provide a first video component, such as first video component "G" 113, to a first viewer using the first viewer video unit.

Returning to FIG. 4, in one embodiment, once a first viewer, or class of viewers, is provided a first viewer video unit synchronized to provide the first viewer with only the first video steam and first video component of ASSIGN A FIRST VIDEO COMPONENT ASSOCIATED WITH THE FIRST VERSION OF THE AT LEAST PART OF THE VIDEO PROGRAM TO THE FIRST SYNCHRONIZED AND INTERLACED VIDEO STREAM OPERATION 407 associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 at PROVIDE A FIRST VIEWER WITH A FIRST VIEWER VIDEO UNIT SYNCHRONIZED BY A VIDEO SYNCHRONIZATION SIGNAL TO RECEIVE ONLY THE FIRST VIDEO STREAM OF THE SYNCHRONIZED AND INTERLACED VIDEO STREAMS TO DISPLAY ONLY THE FIRST VIDEO COMPONENT ASSOCIATED WITH THE FIRST VERSION OF THE AT LEAST PART OF THE VIDEO PROGRAM TO THE FIRST VIEWER OPERATION 415, process flow proceeds to PROVIDE A SECOND VIEWER WITH A SECOND VIEWER VIDEO UNIT SYNCHRONIZED BY A VIDEO SYNCHRONIZATION SIGNAL TO RECEIVE ONLY THE SECOND VIDEO STREAM OF THE SYNCHRONIZED AND INTERLACED VIDEO STREAMS TO DISPLAY ONLY THE SECOND VIDEO COMPONENT ASSOCIATED WITH THE SECOND VERSION OF THE AT LEAST PART OF THE VIDEO PROGRAM TO THE SECOND VIEWER OPERATION 417.

In one embodiment, at PROVIDE A SECOND VIEWER WITH A SECOND VIEWER VIDEO UNIT SYNCHRONIZED BY A VIDEO SYNCHRONIZATION SIGNAL TO RECEIVE ONLY THE SECOND VIDEO STREAM OF THE SYNCHRONIZED AND INTERLACED VIDEO STREAMS TO DISPLAY ONLY THE SECOND VIDEO COMPONENT ASSOCIATED WITH THE SECOND VERSION OF THE AT LEAST PART OF THE VIDEO PROGRAM TO THE SECOND VIEWER OPERATION 417 a second viewer, or class of viewers, is provided a second viewer video unit synchronized to provide the second viewer with only the second video steam and second video component of ASSIGN A SECOND VIDEO COMPONENT ASSOCIATED WITH THE SECOND VERSION OF THE AT LEAST PART OF THE VIDEO PROGRAM TO THE SECOND SYNCHRONIZED AND INTERLACED VIDEO STREAM OPERATION 409 associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, at PROVIDE A SECOND VIEWER WITH A SECOND VIEWER VIDEO UNIT SYNCHRONIZED BY A VIDEO SYNCHRONIZATION SIGNAL TO RECEIVE ONLY THE SECOND VIDEO STREAM OF THE SYNCHRONIZED AND INTERLACED VIDEO STREAMS TO DISPLAY ONLY THE SECOND VIDEO COMPONENT ASSOCIATED WITH THE SECOND VERSION OF THE AT LEAST PART OF THE VIDEO PROGRAM TO THE SECOND VIEWER OPERATION 417 the second viewer, or second class of viewers, is provided a second viewer video unit, such as second viewer video unit 160 of FIGS. 1 and 2.

Returning to FIG. 4, in one embodiment, the second viewer video unit of PROVIDE A SECOND VIEWER WITH A SECOND VIEWER VIDEO UNIT SYNCHRONIZED BY A VIDEO SYNCHRONIZATION SIGNAL TO RECEIVE ONLY THE SECOND VIDEO STREAM OF THE SYNCHRONIZED AND INTERLACED VIDEO STREAMS TO DISPLAY ONLY THE SECOND VIDEO COMPONENT ASSOCIATED WITH THE SECOND VERSION OF THE AT LEAST PART OF THE VIDEO PROGRAM TO THE SECOND VIEWER OPERATION 417 is a pair of 3-D viewing glasses, or any other form of active shutter viewing device as discussed herein, and/or as known in the art at the time of filing, and/or as developed after the time of filing.

As noted above, in one embodiment, the second viewer video unit of PROVIDE A SECOND VIEWER WITH A SECOND VIEWER VIDEO UNIT SYNCHRONIZED BY A VIDEO SYNCHRONIZATION SIGNAL TO RECEIVE ONLY THE SECOND VIDEO STREAM OF THE SYNCHRONIZED AND INTERLACED VIDEO STREAMS TO DISPLAY ONLY THE SECOND VIDEO COMPONENT ASSOCIATED WITH THE SECOND VERSION OF THE AT LEAST PART OF THE VIDEO PROGRAM TO THE SECOND VIEWER OPERATION 417 includes a video sync signal receiving unit, such as video sync signal receiving unit 167 of FIG. 1, for receiving a video synchronization signal from a video sync signal sending unit, such as video sync signal sending unit 117 of FIGS. 1 and 2.

As also noted above, in one embodiment, the synchronization signal causes both lenses of the second viewer video unit to be shuttered at a time such that, instead of alternating the shuttering of single lenses, as is currently done, both lenses of the second viewer video unit are shuttered to provide a second video component, such as second video component "R" 115, to a second viewer using the second viewer video unit.

Returning to FIG. 4, in one embodiment, once a second viewer, or class of viewers, is provided a second viewer video unit synchronized to provide the second viewer with only the second video steam and second video component of ASSIGN A SECOND VIDEO COMPONENT ASSOCIATED WITH THE SECOND VERSION OF THE AT LEAST PART OF THE VIDEO PROGRAM TO THE SECOND SYNCHRONIZED AND INTERLACED VIDEO STREAM OPERATION 409 associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 at PROVIDE A SECOND VIEWER WITH A SECOND VIEWER VIDEO UNIT SYNCHRONIZED BY A VIDEO SYNCHRONIZATION SIGNAL TO RECEIVE ONLY THE SECOND VIDEO STREAM OF THE SYNCHRONIZED AND INTERLACED VIDEO STREAMS TO DISPLAY ONLY THE SECOND VIDEO COMPONENT ASSOCIATED WITH THE SECOND VERSION OF THE AT LEAST PART OF THE VIDEO PROGRAM TO THE SECOND VIEWER OPERATION 417, process flow proceeds to PROVIDE THE FIRST VIEWER WITH A FIRST AUDIO UNIT SYNCHRONIZED TO RECEIVE THE FIRST AUDIO CHANNEL OF THE AT LEAST TWO DISTINCT AUDIO CHANNELS TO PROVIDE THE FIRST VIEWER WITH ONLY THE FIRST AUDIO COMPONENT ASSOCIATED WITH THE FIRST VERSION OF THE AT LEAST PART OF THE VIDEO PROGRAM OPERATION 419.

In one embodiment, at PROVIDE THE FIRST VIEWER WITH A FIRST AUDIO UNIT SYNCHRONIZED TO RECEIVE THE FIRST AUDIO CHANNEL OF THE AT LEAST TWO DISTINCT AUDIO CHANNELS TO PROVIDE THE FIRST VIEWER WITH ONLY THE FIRST AUDIO COMPONENT ASSOCIATED WITH THE FIRST VERSION OF THE AT LEAST PART OF THE VIDEO PROGRAM OPERATION 419 the first viewer, or a first class of viewers, is/are provided a first viewer audio unit synchronized to provide the first viewer with only the first audio channel and first audio component of ASSIGN A FIRST AUDIO COMPONENT ASSOCIATED WITH THE FIRST VERSION OF THE AT LEAST PART OF THE VIDEO PROGRAM TO A FIRST AUDIO CHANNEL OF THE AT LEAST TWO DISTINCT AUDIO CHANNELS OPERATION 411 associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, the first viewer audio unit is a pair of multi-channel headphones, or any other multiple audio channel devices as discussed herein, and/or as known in the art at the time of filing, and/or as developed after the time of filing.

In one embodiment, at PROVIDE THE FIRST VIEWER WITH A FIRST AUDIO UNIT SYNCHRONIZED TO RECEIVE THE FIRST AUDIO CHANNEL OF THE AT LEAST TWO DISTINCT AUDIO CHANNELS TO PROVIDE THE FIRST VIEWER WITH ONLY THE FIRST AUDIO COMPONENT ASSOCIATED WITH THE FIRST VERSION OF THE AT LEAST PART OF THE VIDEO PROGRAM OPERATION 419 the first viewer is provided a first viewer audio unit such as first viewer audio unit 160 of FIGS. 1 and 2.

As noted above, in on embodiment, the first viewer audio unit includes an audio sync signal receiving unit, such as audio sync signal receiving unit 167 of FIG. 1, for receiving an audio synchronization signal from an audio sync signal sending unit, such as audio sync signal sending unit 127 of FIGS. 1 and 2. As also noted above, in one embodiment, the synchronization signal causes the first viewer audio unit to receive audio content, such as first audio component "G" 123 of FIGS. 1 and 2, on a first audio channel while blocking audio content, such as second audio component "R" 125 of FIGS. 1 and 2, on a second audio channel.

Returning to FIG. 4, in one embodiment, once the first viewer, or a first class of viewers, is/are provided a first viewer audio unit synchronized to provide the first viewer with only the first audio channel and first audio component of ASSIGN A FIRST AUDIO COMPONENT ASSOCIATED WITH THE FIRST VERSION OF THE AT LEAST PART OF THE VIDEO PROGRAM TO A FIRST AUDIO CHANNEL OF THE AT LEAST TWO DISTINCT AUDIO CHANNELS OPERATION 411 associated with the first version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 at PROVIDE THE FIRST VIEWER WITH A FIRST AUDIO UNIT SYNCHRONIZED TO RECEIVE THE FIRST AUDIO CHANNEL OF THE AT LEAST TWO DISTINCT AUDIO CHANNELS TO PROVIDE THE FIRST VIEWER WITH ONLY THE FIRST AUDIO COMPONENT ASSOCIATED WITH THE FIRST VERSION OF THE AT LEAST PART OF THE VIDEO PROGRAM OPERATION 419, process flow proceeds to PROVIDE THE SECOND VIEWER WITH A SECOND AUDIO UNIT SYNCHRONIZED TO RECEIVE THE SECOND AUDIO CHANNEL OF THE AT LEAST TWO DISTINCT AUDIO CHANNELS TO PROVIDE THE SECOND VIEWER WITH ONLY THE SECOND AUDIO COMPONENT ASSOCIATED WITH THE SECOND VERSION OF THE AT LEAST PART OF THE VIDEO PROGRAM OPERATION 421.

In one embodiment, at PROVIDE THE SECOND VIEWER WITH A SECOND AUDIO UNIT SYNCHRONIZED TO RECEIVE THE SECOND AUDIO CHANNEL OF THE AT LEAST TWO DISTINCT AUDIO CHANNELS TO PROVIDE THE SECOND VIEWER WITH ONLY THE SECOND AUDIO COMPONENT ASSOCIATED WITH THE SECOND VERSION OF THE AT LEAST PART OF THE VIDEO PROGRAM OPERATION 421 the second viewer, or a second class of viewers, is/are provided a second viewer audio unit synchronized to provide the second viewer with only the second audio channel and second audio component of ASSIGN A SECOND AUDIO COMPONENT ASSOCIATED WITH THE SECOND VERSION OF THE AT LEAST PART OF THE VIDEO PROGRAM TO A SECOND AUDIO CHANNEL OF THE AT LEAST TWO DISTINCT AUDIO CHANNELS OPERATION 413 associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402.

In one embodiment, the second viewer audio unit is a pair of multi-channel headphones, or any other multiple audio channel devices as discussed herein, and/or as known in the art at the time of filing, and/or as developed after the time of filing.

In one embodiment, at PROVIDE THE SECOND VIEWER WITH A SECOND AUDIO UNIT SYNCHRONIZED TO RECEIVE THE SECOND AUDIO CHANNEL OF THE AT LEAST TWO DISTINCT AUDIO CHANNELS TO PROVIDE THE SECOND VIEWER WITH ONLY THE SECOND AUDIO COMPONENT ASSOCIATED WITH THE SECOND VERSION OF THE AT LEAST PART OF THE VIDEO PROGRAM OPERATION 421 the second viewer is provided a second viewer audio unit such as second viewer audio unit 170 of FIGS. 1 and 2.

As noted above, in one embodiment, the second viewer audio unit includes an audio sync signal receiving unit, such as audio sync signal receiving unit 177 of FIG. 1, for receiving an audio synchronization signal from an audio sync signal sending unit, such as audio sync signal sending unit 127 of FIGS. 1 and 2. As also noted above, in one embodiment, the synchronization signal causes the second viewer audio unit to receive audio content, such as second audio component "R" 125 of FIGS. 1 and 2, on a second audio channel while blocking audio content, such as first audio component "G" 123 of FIGS. 1 and 2, on the first audio channel.

In one embodiment, as shown above, a first class of viewers using a first viewer viewing system, such as first viewer viewing system 103 of FIG. 1, is provided a first video component, such as first video component "G" 113 of FIGS. 1 and 2, and a matching first audio component, such as first audio component "G" 123 of FIGS. 1 and 2, that is associated with a first version of at least a portion of a video program, while being blocked from seeing/hearing a second video component, such as second video component "R" 115 of FIGS. 1 and 2, and a matching second audio component, such as second audio component "R" 125 of FIGS. 1 and 2, that is associated with a second version of the at least a portion of the video program.

Likewise, in one embodiment, at virtually the same time, a second class of viewers using a second viewer viewing system, such as second viewer viewing system 105 of FIG. 1, is provided a second video component, such as second video component "R" 115 of FIGS. 1 and 2, and a matching second audio component, such as second audio component "R" 125 of FIGS. 1 and 2, that is associated with a second version of the at least a portion of the video program while being blocked from seeing/hearing a first video component, such as first video component "G" 113 of FIGS. 1 and 2, and a matching first audio component, such as first audio component "G" 123 of FIGS. 1 and 2, that is associated with a first version of the at least a portion of the video program.

Returning to FIG. 4, in one embodiment, once the second viewer, or a second class of viewers, is/are provided a second viewer audio unit synchronized to provide the second viewer with only the second audio channel and second audio component of ASSIGN A SECOND AUDIO COMPONENT ASSOCIATED WITH THE SECOND VERSION OF THE AT LEAST PART OF THE VIDEO PROGRAM TO A SECOND AUDIO CHANNEL OF THE AT LEAST TWO DISTINCT AUDIO CHANNELS OPERATION 413 associated with the second version of the at least a portion of the video program of CREATE AT LEAST A FIRST AND SECOND VERSION OF AT LEAST PART OF A VIDEO PROGRAM, EACH OF THE VERSIONS OF THE AT LEAST PART OF THE VIDEO PROGRAM INCLUDING THEIR OWN ASSOCIATED VIDEO AND AUDIO COMPONENTS OPERATION 402 at PROVIDE THE SECOND VIEWER WITH A SECOND AUDIO UNIT SYNCHRONIZED TO RECEIVE THE SECOND AUDIO CHANNEL OF THE AT LEAST TWO DISTINCT AUDIO CHANNELS TO PROVIDE THE SECOND VIEWER WITH ONLY THE SECOND AUDIO COMPONENT ASSOCIATED WITH THE SECOND VERSION OF THE AT LEAST PART OF THE VIDEO PROGRAM OPERATION 421, process flow proceeds to EXIT OPERATION 431. In one embodiment, at EXIT OPERATION 431 process for providing individualized video program content is exited.

Using process for providing individualized video program content 400, different classes, or types of viewers, such as children and adults, are provided a separate version of a video program that is appropriate to that class of viewer at virtually the same time, and in a single presentation of the video program. Consequently, using process for providing individualized video program content 400, families are provided the ability to view a video program together, as a family, without compromising video program content for the adults or exposing children to inappropriate content. Therefore, process for providing individualized video program content 400 provides families with more entertainment options and more opportunities to take part in activities that include the entire family.

In the discussion above, certain aspects of one embodiment include process steps or operations or instructions described herein for illustrative purposes in a particular order or grouping. However, the particular order or grouping shown and discussed herein is illustrative only and not limiting. Those of skill in the art will recognize that other orders or grouping of the process steps or operations or instructions are possible and, in some embodiments, one or more of the process steps or operations or instructions discussed above can be combined or deleted. In addition, portions of one or more of the process steps or operations or instructions can be re-grouped as portions of one or more other of the process steps or operations or instructions discussed herein. Consequently, the particular order or grouping of the process steps or operations or instructions discussed herein does not limit the scope of the invention as claimed below.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols.

Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations.

Therefore, numerous variations, whether explicitly provided for by the specification or implied by the specification or not, may be implemented by one of skill in the art in view of this disclosure.

What is claimed is:

1. A method for providing individualized video program content comprising:
    providing first, second and third video streams, the first video stream containing common video information to be provided at one or more times simultaneously to both of a first and second viewer, the second video stream containing second video information to be provided at one or more times only to the second viewer, and the third video stream containing third video information to be provided at one or more times only to the first viewer, the first, second, and third video streams together comprising a single video program, with the first, second and third video streams being different from each other;
    providing first, second and third audio streams, the first audio stream containing common audio information to be provided simultaneously to the first and second viewers, the second audio stream containing second audio information to be provided at one or more times only to the second viewer, and the third audio stream containing third audio information to be provided only to the first viewer, the first, second and third audio streams synchronized with respective ones of the first, second and third video streams;
    dividing a video program time period into at least a first time period, a second time period and a third time period, the first, second and third time periods being contiguous time periods, the second time period following the first time period and before the third time period, with the third time period following the first and second time periods;
    providing, during the first time period, the first video stream and the first audio stream simultaneously to the first and second viewers, with the first audio stream synchronized with the first video stream;
    providing, during the second time period, an interleaved combination of the second and third video streams and an interleaved combination of the second and third audio streams coordinated with the interleaved combination of the second and third video streams, wherein the second video stream and the third video stream are alternatively provided to respective ones of the second and first viewers coordinated with respective ones of second and third audio streams;
    providing, during the third time period, the first video stream and the first audio stream simultaneously to the first and second viewers, with the first audio stream synchronized with the first video stream.

2. The method for providing individualized video program content of claim 1, wherein:
    the second video stream is a "child friendly" version of at least a portion of the single video program;
    the third video stream is an adult version of at least a portion of the single video program.

3. A system for providing individualized video program content comprising:
    a video program source including at least a video source and an audio source,
    the video source configured to provide first, second and third video streams, the first video stream containing common video information to be provided at one or more times simultaneously to both of a first and second viewer, the second video stream containing second video information to be provided at one or more times only to the second viewer, and the third video stream containing third video information to be provided at one or more times only to the first viewer, the first, second, and third video streams together comprising a single video program, with the first, second and third video streams being different from each other;
    the audio source configured to provide first, second and third audio streams, the first audio stream containing common audio information to be provided simultaneously to the first and second viewers, the second audio stream containing second audio information to be provided at one or more times only to the second viewer, and the third audio stream containing third audio information to be provided only to the first viewer, the first, second and third audio streams synchronized with respective ones of the first, second and third video streams;

dividing a video program time period into at least a first time period, a second time period and a third time period, the first, second and third time periods being contiguous time periods, the second time period following the first time period and before the third time period, with the third time period following the first and second time periods;

the video program source providing, during the first time period, the first video stream and the first audio stream simultaneously to the first and second viewers, with the first audio stream synchronized with the first video stream;

the video program source providing, during the second time period, an interleaved combination of the second and third video streams and an interleaved combination of the second and third audio streams coordinated with the interleaved combination of the second and third video streams, wherein the second video stream and the third video stream are alternatively provided to respective ones of the second and first viewers coordinated with respective ones of second and third audio streams;

the video program source providing, during the third time period, the first video stream and the first audio stream simultaneously to the first and second viewers, with the first audio stream synchronized with the first video stream.

4. The system for providing individualized video program content of claim 3, wherein;

The video program source is a 3-D television.

5. The system for providing individualized video program content of claim 3, wherein;

at least one of either the first or second viewer is using 3 D television active shutter glasses.

6. The system for providing individualized video program content of claim 2, wherein:

the second video stream is a "child friendly" version of at least a portion of the single video program; and the third video stream is an adult version of at least a portion of the single video program.

* * * * *